Sept. 5, 1967     D. E. BURROUGH ET AL     3,339,352

CROP CONDITIONER

Filed March 17, 1965     2 Sheets-Sheet 1

INVENTORS
D. E. BURROUGH
W. R. WOOD

BY John M. Nolan

ATTORNEY

Sept. 5, 1967 D. E. BURROUGH ET AL 3,339,352
CROP CONDITIONER

Filed March 17, 1965 2 Sheets-Sheet 2

INVENTORS
D. E. BURROUGH
W. R. WOOD
BY
John M. Nolan
ATTORNEY

# United States Patent Office 3,339,352
Patented Sept. 5, 1967

3,339,352
CROP CONDITIONER
Donald E. Burrough and William R. Wood, Ottumwa, Iowa, assignors to Deere & Company, Moline, Ill., a corporation of Delaware
Filed Mar. 17, 1965, Ser. No. 440,513
17 Claims. (Cl. 56—1)

ABSTRACT OF THE DISCLOSURE

A pull-type crop conditioner mounted on a pair of transversely spaced support wheels and having a pair of adjacent, transverse conditioner rolls, one of which is shiftable toward and away from the other, the shiftable roll being connected to support wheels and biased toward the opposite roll by the weight of the machine.

This invention relates to a crop conditioner and more particularly to an improved mounting mechanism for the conditioner rolls.

A crop conditioner is used to crush or crack the stems of a previously cut crop, such as hay, to accelerate curing of the crop. In a conventional crop conditioner, the cut crop is picked up from the field and passed between a pair of rolls, which extend transverse to the direction of machine travel, and which may be smooth, fluted or a combination of the two. One of the rolls is conventionally mounted on the frame on a fixed axis, and the other roll is mounted on the frame through a mechanism which allows movement toward and away from the first roll. The second roll is usually biased toward the first roll by some type of spring means to provide the necessary pressure on the crushing rolls. However, the deflection of the spring means varies with the movement of the roll, varying the roll pressure.

The present invention provides an improved mechanism for mounting the movable roll, whereby the machine is supported through the crushing rolls when the machine is operating, and the weight of the machine provides a constant crushing pressure regardless of the relative positions of the rolls. The novel roll-mounting mechanism also provides for the automatic raising of the machine, when large bunches of hay are passed through the rolls.

Accordingly, the general object of the present invention is to provide a crop conditioner having improved mounting means for a movable crushing roll.

A more specific object is to provide such a mounting means whereby the weight of the machine provides the pressure on the crushing rolls, and the pressure on the crushing rolls is constant regardless of the separation of the rolls.

Another object is to provide such a crop conditioner which automatically raises when the crushing rolls are separated by large bunches of crop material, and further to provide such a crop conditioner which can be selectively raised or lowered by the operator to vary the operating height of the machine, without changing the pressure on the crushing rolls.

Another object is to provide such a crop conditioner with a variable stop means for selectively establishing the minimum clearance between the crushing rolls.

Another object is to provide such a crop conditioner on which power means for raising and lowering the machine can be optionally added.

Still another object is to provide such a crop conditioner and roll mounting mechanism of simple and rugged construction to provide a machine which is reliable in operation and easy to maintain.

These and other objects of the invention will become apparent from a consideration of the following detailed description and accompanying drawings wherein.

Figure 1:
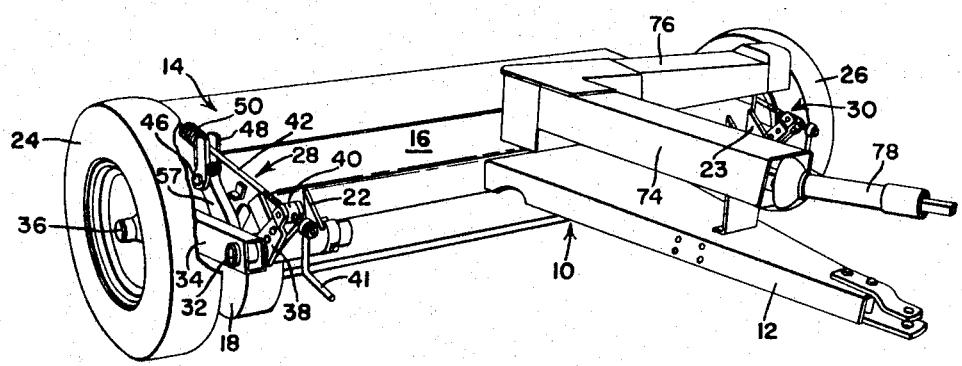
FIG. 1 is a perspective view of the crop conditioner with a portion of one wheel broken away to show the movable roll mounting mechanism.

In the drawings, there is shown a crop conditioner having a main frame 10, which includes a forwardly extending draft member 12 attachable to a tractor for pulling the machine over a field of previously mowed crops, which are lying in swaths on the crop stubble. The frame 10 also includes a housing portion 14, which has a horizontal top member 16 extending between depending side members 18 and 20. The housing portion 14 is substantially open toward the front, the bottom, and the rear, to allow the entrance and discharge of the crop to and from the housing. The frame 10 also includes a pair of brackets 22 and 23, which extend forwardly from the opposite sides of the housing 14.

It is to be understood that such words as "top," "bottom," "front," "rear," etc. are mere words of convenience used to more clearly describe the invention and are not to be construed as limiting terms.

The frame 10 is carried on support means 24 and 26, here shown as a pair of wheels located on opposite sides of the machine and respectively connected to the frame via mounting means indicated generally by the numerals 28 and 30. The mounting means 28 and 30 are identical, and consequently only the mounting means 28 will be described in detail. The mounting means 28 includes a transverse horizontal rockshaft 32 journaled at the forward end of the bracket 22. The mounting means 30 includes a similar rockshaft (not shown), which is coaxial with the rockshaft 32 and journaled in the bracket 23. In the embodiment shown in FIGS. 1 and 2, the rockshafts are shown as separate shafts for separate operation of the mounting means 28 and 30, although the rockshafts can be extended and joined to form a single rockshaft for operation of the mounting means in unison.

An arm 34 has one end affixed to the rockshaft 32 and carries an axle 36 parallel to the rockshaft 32 at its other end. The wheel 24 is mounted on the axle 36. A second arm 38 also has one end attached to the rockshaft 32, and extends in a generally upwardly and forwardly direction and carries a threaded member 40 at its end. A rod or shaft 42, having a threaded portion 43 which extends through the threaded member 40, extends rearwardly over the top member 16 of the housing portion 14 and and is rotatable in the threaded member 40 by a crank means 41 attached to its forward end, the threaded connection between the rod 42 and the member 40 providing adjusting means through which the effective length of the rod 42 can be varied.

Figure 2:
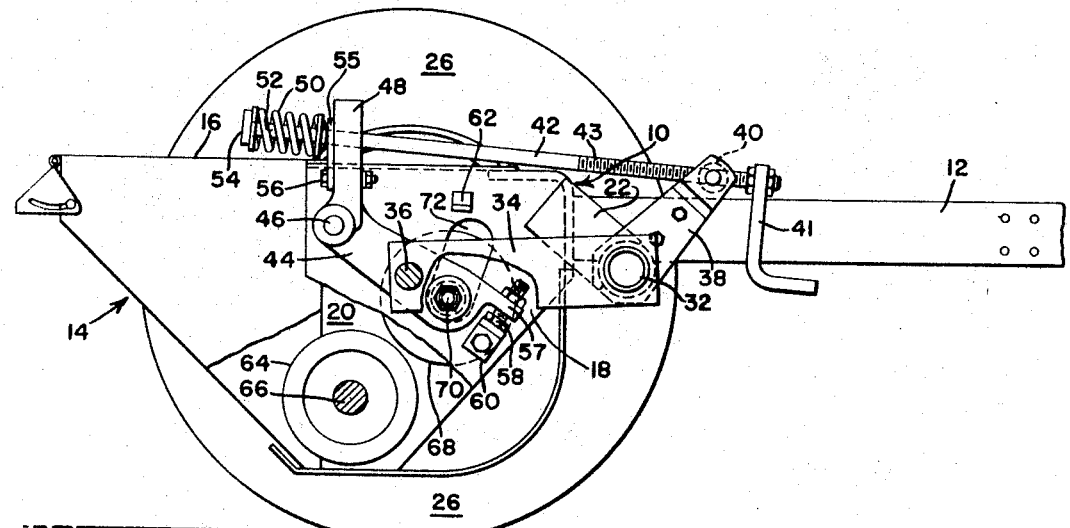
FIG. 2 is a side elevation of the crop conditioner, omitting the drive mechanism, with the near wheel and a portion of the frame removed and showing the crop conditioner in an operating position.

A bell crank 44 is rockably mounted on a shaft 46 parallel to and spaced rearwardly from the rockshaft 32, and has an upwardly extending slotted arm 48. The rod 42 extends through the slot in the arm 48 and engages the arm 48 via a helical compression spring 50 coaxially mounted around the end 52 of the rod 42 and held thereon by a retaining means 54 and a plate-like member 55 removably and adjustably attached to the rearward side of the arm 48 by a fastener 56, the member 55 having a fore-and-aft aperture substantially the same in size as and slidably receiving the rod 42. Since the rod 42 extends through the arm 48 and the forward end of the spring 50 engages the member 55 on the rear surface of the arm 48, only a counterclockwise rotation of the bell crank (as shown in FIG. 2) is effective to impart an axial force on the rod 42. The effective length of the arm 48 is variable by loosening the fastener 56 and sliding the member 55 along the arm 48, thereby shifting the rod 42 and the point on the arm that receives the force transmitted through the rod and the spring 50, the fastener 56 being tightened to lock the member 55 in the desired position on the arm 48.

The other arm 57 of the bell crank 44 extends obliquely from the arm 48. The clockwise or downward movement of the bell crank arm 57 (as shown in FIG. 2) is limited by a first stop means 60, which is mounted on the side member 18 and engages the arm 57 through an adjusting means 58 mounted at the end of the arm 57, whereby the lower position of the arm 57 is variable. The clockwise or upward movement of the arm 57 is limited by a second stop means 62, which is also mounted on the side member 18 and is engageable with the arm 57.

The frame 10 rotatably carries a first or fixed-axis roll 64, which extends horizontally and transverse to the direction of machine travel and has an axial shaft 66 journaled at opposite ends in the side members 18 and 20 respectively. A second or movable roll 68 is parallel to and cooperates with the first roll and has a central shaft 70, the opposite ends of which extend through a pair of slots 72 in the side members 18 and 20 respectively and are journaled in the arms 57 in the mounting means 28 and 30 respectively.

The second or movable roll 68 is spaced forwardly and above the fixed roll 64 and is movable toward and away from the fixed roll 64 in a vertical arc about the shaft 46, between the stop means 60 and 62, to vary the distance between the rolls, the slots 72 accommodating the movement of the shaft 70.

The rolls are driven in opposite directions through drive means (not shown), operating under drive shields 74 and 76 and connectible to a tractor power take-off mechanism through a drive shaft 78 (FIG. 1).

In operation, the rolls 64 and 68 pick up the cut crop from the field as the machine advances and move the crop upwardly and rearwardly between the rolls. The minimum clearance between the rolls is established via the adjusting means 58.

The machine supporting force through the wheels 24 and 26 is exerted upwardly on the arm 34 at the axle 36, while the weight of the machine, supported by the frame 10, exerts a downward force on the arm 34 at the rockshaft 32 through the brackets 22 and 23. This creates a clockwise torque (FIG. 2) on the rockshaft 32 and the arm 38 connected thereto, which exerts a forwardly directed force on the rod 42, which in turn exerts a clockwise torque on the bell crank 44 via the spring 50. The torque on the bell crank 44 urges the arm 57 against the stop means 60 and biases the movable roll 68 toward the fixed roll 64. Thus, the crushing pressure is provided by the weight of the machine through the mounting means 28 and 30 and is constant regardless of the position of the machine or the separation of the rolls. The crushing pressure can be varied by varying the effective length of the arm 48 as previously described, the torque on the ball crank 44 being proportional to the effective length of the lever arm 48 for any given force transmitted through the rod 42.

If large bunches of hay are encountered, the rolls will be forced apart and the movement of the roll 68 creates a counterclockwise torque on the arm 34 via the bell crank 44, the spring 50, the rod 42, the arm 38, and the rockshaft 32, which raises the frame 10. The spring 50 functions as a shock absorber in the mounting means 28 to absorb the impact due to sudden separation of the rolls or the movement of the machine along rough terrain.

In FIG. 2, the machine is shown in operating position. To raise or lower the frame 10, and consequently the rolls 64 and 68, to accommodate changes in crop conditions, the rod 42 is rotated in the threaded member 40 via the crank 41 to change the effective length of the rod 42 between the bell crank 44 and the arm 38. Shortening the effective length of said rod rotates the arm 34 about the axle 36 to raise the rockshaft 32 and consequently the frame 10. Conversely, lengthening the distance of the rod between the arm 48 and the arm 38 allows a clockwise rotation of the arm 34 and rockshaft 32 about the axle 36 to lower the frame.

Figure 3:
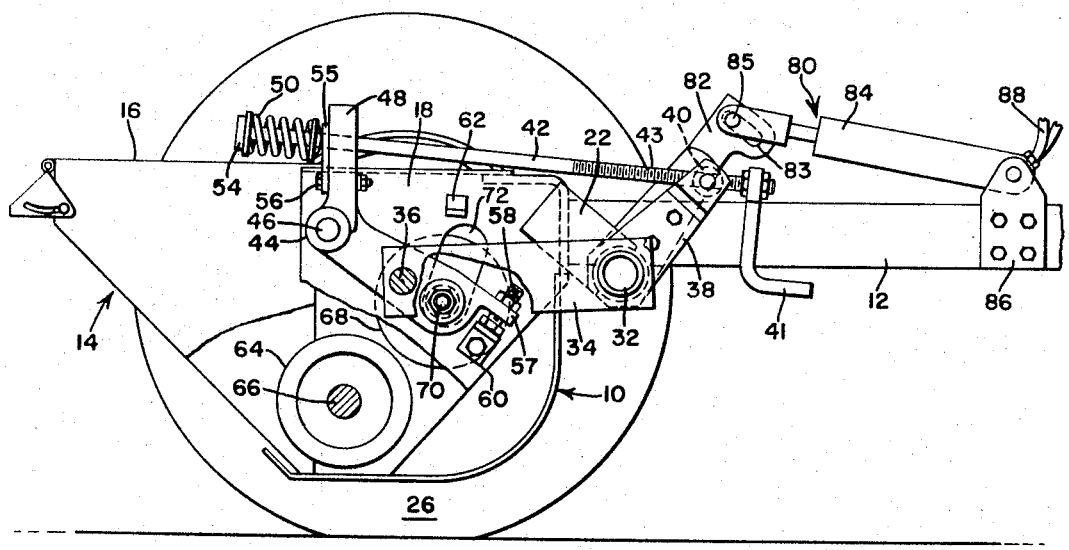
FIG. 3 is a view similar to FIG. 2 of a different embodiment of the crop conditioner, including power means to raise and lower the machine.
Figure 4:
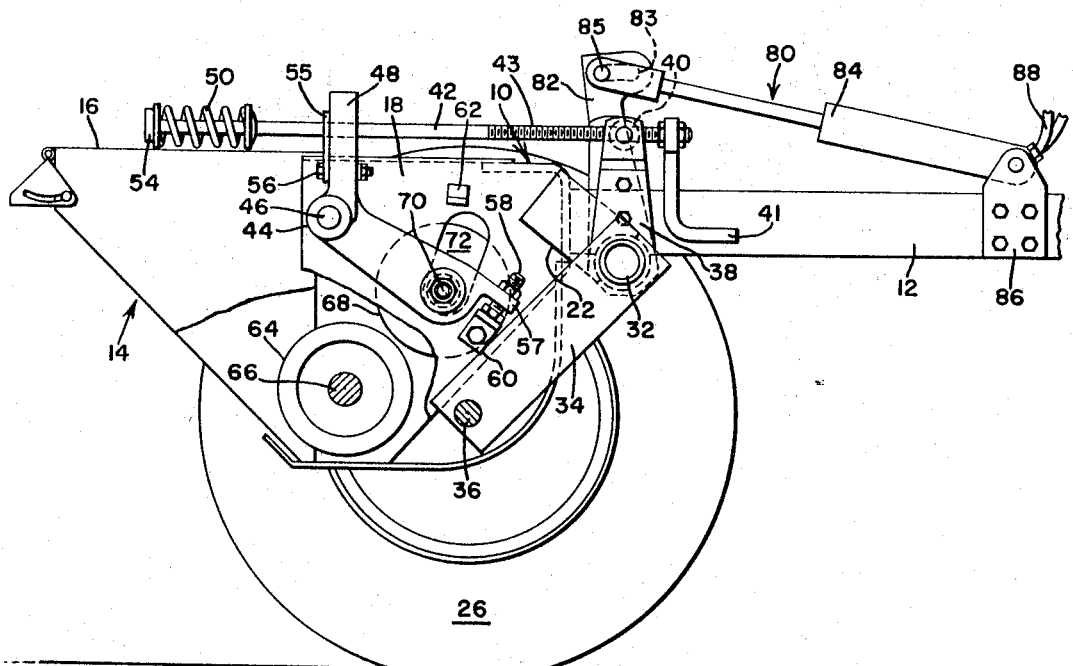
FIG. 4 is a view similar to FIG. 3 with the machine in an elevated or transportation position.

The embodiment shown in FIGS. 3 and 4 is identical to the embodiment shown in FIGS. 1 and 2 except that an optional power lift means 80 is included for raising the machine. The rockshaft 32 is extended to form a single rockshaft for both mounting means 28 and 30. The power lift means 80 includes a radial arm 82, which is affixed to the rockshaft 32 and which has a circumferentially extending slot 83, and a hydraulic ram 84, connected at one end to the end of the arm 82 via a pin 85 sliding in the slot 83 and at the other end to the draft tongue 12 via a bracket 86. Extension of the ram is preferably controlled by hydraulic control means on the tractor (not shown) via the hydraulic lines 88.

When the machine is in operating position as shown in FIG. 3, the hydraulic ram 84 is retracted and the weight of the machine exerts the crushing pressure through the mounting means 28 and 30 as previously described. The pin 85 slides in the slot 83 to permit the separation of the rolls. The crank 41 is still utilized to adjust the operating height of the machine. However, to quickly raise the machine to clear an obstruction or place the machine in transport position, the hydraulic ram 84 is actuated. As shown in FIG. 4, after the pin 85 engages the end of the slot 83, the extension of the ram 84 rotates the rockshaft 32 and the arm 34 about the axle 36, raising the frame 10 via the brackets 22 and 23. The rotation of the rockshaft 32 also rotates the arm 38 which imparts a rearward motion to the rod 42, which causes the spring 50 to disengage the arm 48 of the bell crank 44. The crushing roll 68 carried by the bell crank 44 remains in its operating position with the arm 57 engaging the first stop means 60. However, when the machine is raised via the power lift means 80, the weight of the machine is supported through said power lift means rather than through the crushing rolls 64 and 68, and the weight of the roll 68 is the only force which maintains the arm 57 against the first stop means 60.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A crop conditioner comprising: a main frame; a first roll journaled on the frame and having a horizontal axis transverse to the direction of machine travel; a second roll; a ground-engaging support means; and mounting means on the frame for connecting the support means to the frame to suspend the frame above the ground, the second roll also being rotatably carried by the mounting means parallel and adjacent to the first roll, the mounting means interconnecting the second roll to the ground-engaging support means so that the weight of the frame exerts a force on the second roll urging it toward the first roll.

2. The invention defined in claim 1 and including stop means mounted on the frame and engaging the mounting means to support the second roll a predetermined distance from the first roll.

3. A crop conditioner comprising: a main frame; a horizontal first roll journaled on the frame and extending transverse to the direction of machine travel; a second roll closely paralleling the first roll; a pair of ground-engaging wheels disposed on opposite sides of the frame and axially parallel to the rolls; a pair of mounting means carried by the frame, each mounting means journaling a wheel and one end of the second roll, the machine-supporting force exerted by the wheels being transmitted through said mounting means to the second roll and urging the second roll toward the first roll.

4. The invention defined in claim 3 and including stop means mounted on the frame and engaging the mounting means to support the second roll a predetermined distance from the first roll.

5. The invention defined in claim 4 wherein the mounting means includes a first adjusting means for varying the effective length of the mounting means between the point of engagement with the stop means and the mounting point on the frame to vary the supported height of the frame.

6. The invention defined in claim 5 and including power lift means mounted on the frame and operably connected to the mounting means for raising or lowering the frame.

7. A crop conditioner comprising: a fore-and-aft main frame; a horizontally transverse first roll journalled on the frame; a pair of arms rockably mounted on opposite sides of the frame for movement about an axis parallel to the first roll; a second roll disposed parallel to and upwardly and forwardly from the first roll and journaled at opposite ends in said arms for movement in an arc about the arm axis toward and away from the first roll; stop means mounted on the frame and engaging said roll arms to establish the minimum separation between rolls; a rockshaft mounted on said frame parallel to said rolls; a pair of radial lever arms mounted on said rockshaft; a pair of laterally spaced ground-engaging support wheels respectively carried by said radial arms on opposite sides of the frame for rotation about an axis parallel to the rockshaft; and connecting means operably interconnecting the roll arm and the wheel lever arm on each side of the frame so that the weight of the machine urges the roll arms against said stop means.

8. The invention defined in claim 7 wherein the connecting means includes adjusting means for varying the effective length of the connecting means between the roll arm and the wheel lever arm, whereby the height at which the frame is supported is variable.

9. The invention defined in claim 7 and including a hydraulic ram having one end connected to the frame and the other end operably connected to the wheel lever arm, for movement of the lever arm about the wheel axis in response to actuation of the ram.

10. A crop conditioner comprising: a main frame, including a draft member extending in the direction of machine travel and laterally spaced side members; a first horizontal roll transverse to the direction of machine travel and journalled at opposite ends on the side members; a pair of bell cranks having first and second arms rotatably mounted on opposite side members for rocking movement about axes parallel to the first roll; a second roll, parallel and adjacent to the first roll and journaled at opposite ends on the first arm of said bell cranks for movement toward and away from the first roll with the rocking of the bell crank; a pair of rockshafts mounted on opposite sides of the frame parallel to the rolls; a first lever arm affixed to each rockshaft; a ground-engaging wheel rotatably mounted on each lever arm for rotation about an axis spaced from and parallel to said rockshafts; a second rockshaft lever arm affixed to each rockshaft for movement therewith; and a rod interconnecting each second rockshaft lever arm with the second arm of the bell crank on the same side of the machine, so that the machine weight carried by the frame exerts a downward force on the rockshafts in an arc about the axis of the wheels, which force is transmitted to the second roll via the respective arms on the rockshafts, the rods, and the bell cranks, and urges the second roll toward the first roll.

11. The invention defined in claim 10 and including stop means mounted on the frame and engageable with the bell crank to limit the movement of the second roll toward the first roll and support the machine weight carried by the frame.

12. The invention defined in claim 11 and including a second adjusting means associated with the stop means for the bell crank for selectively varying the distance which the second roll is supported from the first roll.

13. The invention defined in claim 12 and including a first adjusting means for varying the effective length of each rod between the respective rockshaft arms and the second bell crank arms, whereby shortening or lengthening the effective rod length respectively raises or lowers the rockshafts in an arc about the wheel axes.

14. The invention defined in claim 13 wherein the rods include spring means which engage the second bell crank arms for transmitting a force through the rod to the bell crank in one direction only, which force urges the bell crank against the stop means.

15. The invention defined in claim 14 wherein the rockshafts are coaxially joined for rotation in unison and including power lift means operably connected to the rockshaft for rotating the unified rockshaft about its axis and raising the rockshaft and the frame carried thereby in an arc about the axes of said wheels.

16. The invention defined in claim 15 wherein the power lift means comprises a radial arm affixed to the rockshaft and a hydraulic ram having one end attached to the end of said radial arm and the other end attached to the frame.

17. The invention defined in claim 10 wherein the rods are adjustably connected along the second arms of said bell cranks to vary the effective radial length of said arms.

References Cited
UNITED STATES PATENTS

| | | | |
|---|---|---|---|
| 2,924,927 | 2/1960 | Pristo | 56—1 |
| 3,006,124 | 10/1961 | Glass et al. | 56—1 |
| 3,116,582 | 1/1964 | Wathen et al. | 56—1 |

ABRAHAM G. STONE, *Primary Examiner.*

ANTONIO F. GUIDA, *Assistant Examiner.*